United States Patent [19]
Tamura

[11] Patent Number: 4,680,492
[45] Date of Patent: Jul. 14, 1987

[54] AUDIO-FREQUENCY ELECTROMECHANICAL VIBRATOR

[75] Inventor: Yasuji Tamura, Ojima, Japan

[73] Assignee: Sanden Corporation, Gunma, Japan

[21] Appl. No.: 775,011

[22] Filed: Sep. 11, 1985

[30] Foreign Application Priority Data

Sep. 11, 1984 [JP] Japan ............................... 59-188901

[51] Int. Cl.$^4$ ............................................ H02K 41/00
[52] U.S. Cl. ........................................ 310/15; 310/25
[58] Field of Search ....................... 310/15, 30, 25, 27, 310/29, 32, 155

[56] References Cited

U.S. PATENT DOCUMENTS 1,746,171 2/1930 Vatinet et al. ........................ 310/25
2,548,990 4/1951 McLoad ................................ 310/25
3,018,467 1/1962 Harris ............................... 310/27 X
3,202,847 8/1965 Erickson ........................... 310/15 X
3,440,459 4/1969 Pitt et al. ............................... 310/18
3,774,058 11/1973 Abel ..................................... 310/15
4,439,700 3/1984 Menzel et al. .................... 310/27 X

*Primary Examiner*—Donovan F. Duggan
*Attorney, Agent, or Firm*—Banner, Birch, McKie & Beckett

[57] ABSTRACT

An audio frequency electromechanical vibrator comprising a flat plate permanent magnet magnetized in a predetermined direction and a coil wound around the permanent magnet for crossing the direction of magnetization. The permanent magnet and coil are fixedly disposed in a yoke which is elastically supported in a case through a spring plate. The case partly consists of a magnetic plate which is placed for opposing the permanent magnet to form a magnetic flux circuit, whereby the vibrator can generate a vibration corresponding to an audio signal applied to the coil.

5 Claims, 6 Drawing Figures

(PRIOR ART)
FIG. 1
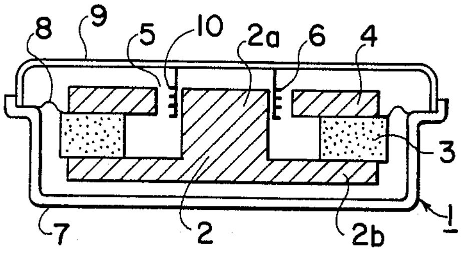
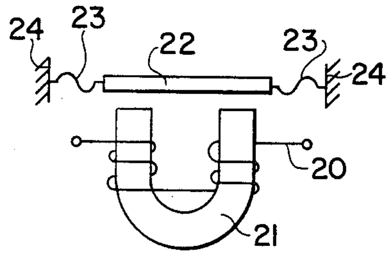
FIG. 2
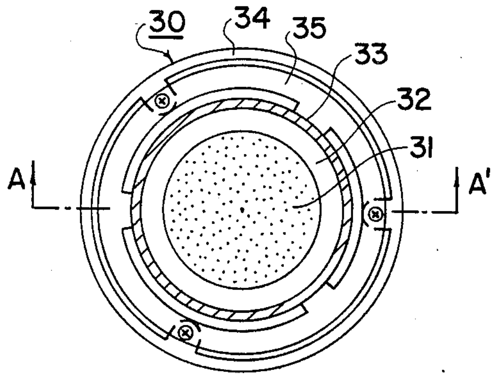
FIG. 3
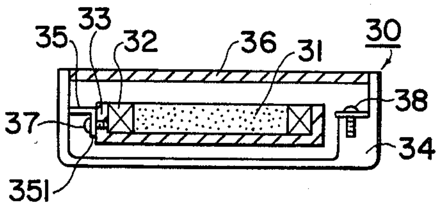
FIG. 4

AUDIO-FREQUENCY ELECTROMECHANICAL VIBRATOR

BACKGROUND OF THE INVENTION

This invention relates to electromechanical vibrators, and more particularly, to audio-frequency electromechanical vibrators adapted for a body-felt vibration reproduction in sound reproducing systems.

Sound reproducing systems that impart a body felt vibration are well known in the prior art. For example, U.S. Pat. No. 4,064,376 discloses an electromechanical vibrator which reproduces from an electric signal not only sound that is heard but also mechanical vibrations, preferably undertones lower than 150 Hz, that are directly transmitted to a body. The electromechanical vibrator for reproducing the mechanical vibration is fitted on a bed or a chair, and an audio signal that is fed to the sound reproducing speakers is also applied to the vibrator, usually after passing through a filter for removing frequency components higher than 150 Hz. A person on the chair or bed feels vibration while listening to the music.

An electro-dynamic transducer is used for the vibrators in such sound reproducing systems. A known vibrator has an arrangement similar to the electro-dynamic speaker shown in U.S. Pat. Nos. 4,064,376 and 4,354,067. FIG. 1 shows a vertical sectional view of a known audio-frequency electromechanical vibrator. The vibrator 1 includes a magnetic circuit comprising an inversed T-shaped magnetic yoke 2 having a center pillar *2a* and a bottom plate *2b*, a ring-shaped permanent magnet 3 disposed on the bottom plate *2b*, and an annular top yoke plate 4 attached to permanent magnet 3. An annular small space or magnetic gap 5 is formed between a top portion of center pillar *2a* and an inner end of annular plate 4. A drive coil 6 is loosely fitted or disposed in magnetic gap 5. The magnetic circuit structure is elastically supported by a case 7 through a spring plate 8, and drive coil 6 is supported by a case cover 9 through a coil bobbin 10.

Since drive coil 6 is disposed in a static magnetic field generated in the magnetic gap 5, drive coil 6 and the magnetic circuit structure (items 2, 3 and 4) are relatively moved when an electric A.C. current is applied to drive coil 6. Thus, the vibrator 1 vibrates in response to an electric audio signal applied to drive coil 6.

Employing this construction, the transmit efficiency on vibrator 1 is determined by the magnetic flux density of magnetic gap 5, and the number of turns and impedance of drive coil 6. Therefore, in order to improve the efficiency of vibrator 1, the size of the magnetic gap 5 should be reduced, and the number of turns and diameter of the wire of drive coil 6 should both be increased. However, drive coil 6 must be placed in magnetic gap 5 without any contact with other moving parts. Thus, drive coil 6 is formed of a small coil of thin wire with high density, and requires a high number of turns to improve the vibrator's efficiency. As a result of the above requirements for improving the efficiency of vibrator 1, high accuracy is required when producing the coil and manufacturing the vibrator which will finally increase the cost of the vibrator.

Also, as is clearly shown in FIG. 1, center pillar *2a* of magnetic yoke 2 is disposed in drive coil 6 to generate the vibration. Thus, the thickness of vibrator 1 cannot effectively be reduced for easily fitting the vibrator into a sheet or chair.

SUMMARY OF THE INVENTION

It is a primary object of this invention to provide an improved audio-frequency electromechanical vibrator which is easily manufactured and assembled, and which effectively reduces the costs of production.

It is another object of this invention to provide an audio-frequency electromechanical vibrator which is generally flat and compact.

An audio frequency electromechanical vibrator in accordance with this invention comprises a flat plate shaped permanent magnet which is magnetized in a predetermined direction, a coil wound around the permanent magnet for crossing the direction of magnetization, and a yoke in which the permanent magnet and the coil are disposed. The yoke is elastically supported in a case through a spring plate. The case partly consists of a magnetic plate which is placed for opposing the yoke with a gap therebetween to form a magnetic flux circuit. When an electric A.C. current is applied to the coil, the magnetic yoke, coil, and magnet assembly will vibrate at a frequency which is equal to the freqūency of the A.C. current.

Further objects, features and other aspects of this invention will be understood from the following detailed description of preferred embodiments of this invention given in connection with the annexed drawings.

BRIEF DESCRIPTION OF THE DRAWINGS

FIG. 1 is a cross sectional view of a known audio-frequency electromechanical vibrator.

FIG. 2 is a diagrammatic view illustrating the theory of this invention.

FIG. 3 is a plane view of an audio-frequency electromechanical vibrator in accordance with one embodiment of this invention.

FIG. 4 is a sectional view take along a line A—A in FIG. 3.

DETAILED DESCRIPTION OF THE PREFERRED EMBODIMENTS

Figure 5:
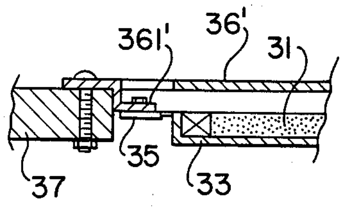
FIG. 5 is a partially enlarged sectional view of an audio-frequency electromechanical vibrator in accordance with another embodiment of this invention.

The theory of this invention will be described with reference to FIG. 2. When a coil 20 is turned on a U-shaped permanent magnet 21 and an electric audio signal is applied to coil 20, the amount of magnetic flux passing through permanent magnet 21 is changed in correspondence to the audio signal. Therefore, if a magnetic plate, for example, steel plate 22 is fixed on stationary element 24 through spring element 23 and is disposed for opposing the magnetic pole of permanent magnet 21, steel plate 22 will be vibrated in correspondence with the change of attracting force generated between the steel plate 22 and permanent magnet 21.

Referring to FIGS. 3 and 4, a vibrator 30 according to an embodiment of this invention comprises circular flat shaped permanent magnet 31 which is magnetized in a direction perpendicular to the page, (in FIG. 4, magnetization is parallel to the page), and an annular coil 32 turned on an outer peripheral surface of permanent magnet 31 for crossing the magnetized direction of permanent magnet 31. Permanent magnet 31 and coil 32 are fixedly disposed within a cup-shaped magnetic yoke 33, i.e., an outer peripheral surface of annular coil 32 is closely fitted on an inner surface of yoke 33.

Yoke 33 is elastically supported in U-shaped annular case 34, which is formed of non-magnetic material, by spring element 35, while permitting relative movement of yoke 33 with case 34. A plurality of flanges 351 vertically extend from the inner peripheral surface of spring plate 35 and are attached to the outer peripheral surface of yoke 33 by some fastening means, for example, a plurality of bolts 37. The outer peripheral portion of spring plate 35 is fixed on the inner surface of case 34 by a series of bolts 38. The open top of case 34 is covered by a flat magnetic plate, for example, steel plate 36, for forming the magnetic flux circuit together with yoke 33.

In the above mentioned construction of vibrator 30, since the magnetic flux circuit is formed by magnetic yoke 33 and steel plate 36, when an audio electrical signal is applied to coil 32, the amount of magnetic flux passed through the magnetic circuit is changed. As the result of the change in magnetic flux, the attracting force generated between yoke 33 and steel plate 36 is changed. Since steel plate 36 is fixed on case 34 and yoke 33 is elastically supported in case 34, the application of an audio signal to coil 32 axially drives yoke 33 reciprocatively to create a vibration corresponding to the audio signal.

Since vibrator 30 is operated due to a change of magnetic flux, the number of turns of coil 32 should be increased as much as possible. However, increasing the number of turns of coil 32 also increases the inductance of coil 32, which will finally reduce the transformed output at high frequencies. But, as mentioned above, vibrator 30 only receives audio signals under 150 Hz, and the above phenomenon can be ignored.

The vibrators disclosed in prior art devices receive signals after they have been passed through a filter which removes signal components higher than 150 Hz. Vibrator 30 can eliminate the unwanted high frequency component by adjusting the industance of coil 32 and the spring constant of spring plate 35. Therefore, the filter device utilized in the audio signal supply circuit for removing the high frequency components is unnecessary.

Furthermore, since the production and assembly of vibrator 30 does not require high accuracy, the cost of the vibrator can be reduced. Since the thickness of the vibrator is mainly determined by the thickness of the permanent magnet, the thickness of the vibrator can also be reduced.

Referring to FIG. 5, another embodiment of this invention is shown which relates to a modification of the casing structure of the vibrator. Magnetic plate 36' is provided with a plurality of supporting portions 361' at its outer peripheral surface, and is elastically connected with the outer peripheral surface of spring plate 35. Therefore, if the outer peripheral portion of magnetic plate 36' is attached to vibration plate 37 or some other stationary portion which is vibrated by the vibrator, the outer case of the vibrator is unnessary, and the vibration of yoke 33 is directly transmitted to the stationally portion or vibration plate through magnetic plate 36'.

Figure 6:
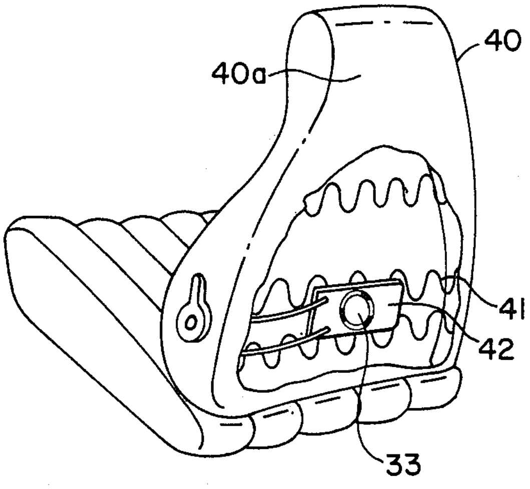
FIG. 6 is a perspective view of a chair using the vibrator shown in FIG. 5.

Referring to FIG. 6, one possible use of the above mentioned vibrator is illustrated. The vibrator is mounted in a chair back 40*a* of a chair 40 by being secured to a cushion spring 41, and an audio signal is subsequently applied to the vibrator. If chair 40 has a lumbar support mechanism, lumbar plate 42 may be used as the magnetic plate 36 or vibration plate 37. The vibrator comprises a minimum number of parts and can easily be adapted to many uses.

This invention has been described in detail in connection with preferred embodiments, but these are for illustrative purposes only and the invention is not restricted thereto. It will be easily understood by those skilled in the art that other variations and modifications can be made without departing from the disclosure of the invention or the scope of the appended claims.

I claim:

1. An audio frequency electromechanical vibrator comprising:

a flat plate shaped permanent magnet which is magnetized in a predetermined direction;

a coil wound around said permanent magnet in a direction different than said predetermined direction;

a yoke in which said permanent magnet and said coil are disposed;

a case element for elastically supporting said yoke, said case element being magnetically attractive to said yoke; and means for applying an alternating current to said coil for causing said magnetic force to change thereby causing a vibratory displacement of said yoke with respect to said case element.

2. The audio frequency electromechanical vibrator of claim 1 wherein said case element comprises a magnetic plate, and said yoke is elastically supported on said magnetic plate.

3. The audio frequency electrmechanical vibrator of claim 1 wherein said yoke is cup-shaped.

4. The audio frequency electromechanical vibrator of claim 1 wherein said yoke is formed of a magnetic material.

5. The audio frequency mechanical vibrator of claim 1 further comprising a spring element attached to said case element for elastically supporting said yoke.

* * * * *